US009227207B1

(12) United States Patent
Bredberg et al.

(10) Patent No.: US 9,227,207 B1
(45) Date of Patent: Jan. 5, 2016

(54) MULTI-NOZZLE CAM DRIVEN SPRINKLER HEAD

(71) Applicants: Anthony J. Bredberg, Gig Harbor, WA (US); Al Davignon, Burien, WA (US)

(72) Inventors: Anthony J. Bredberg, Gig Harbor, WA (US); Al Davignon, Burien, WA (US)

( * ) Notice: Subject to any disclaimer, the term of this patent is extended or adjusted under 35 U.S.C. 154(b) by 0 days.

(21) Appl. No.: 14/206,627

(22) Filed: Mar. 12, 2014

Related U.S. Application Data

(60) Provisional application No. 61/799,760, filed on Mar. 15, 2013.

(51) Int. Cl.
| | |
|---|---|
| *B05B 3/04* | (2006.01) |
| *B05B 15/10* | (2006.01) |
| *B05B 1/20* | (2006.01) |
| *B05B 1/30* | (2006.01) |
| *B05B 12/06* | (2006.01) |
| *B05B 1/08* | (2006.01) |
| *A01G 25/00* | (2006.01) |

(52) U.S. Cl.
CPC .............. *B05B 3/0427* (2013.01); *A01G 25/00* (2013.01); *B05B 1/083* (2013.01); *B05B 1/20* (2013.01); *B05B 1/3013* (2013.01); *B05B 3/044* (2013.01); *B05B 3/0418* (2013.01); *B05B 3/0422* (2013.01); *B05B 12/06* (2013.01); *B05B 15/10* (2013.01)

(58) Field of Classification Search
CPC ...... B05B 1/083; B05B 12/06; B05B 3/0422; B05B 3/0418; B05B 3/044; B05B 1/3013; B05B 3/0427; B05B 15/10; B05B 1/20; A01G 25/00
USPC ........... 239/203–206, 236, 237, 240, 242, 99, 239/101, 562, 248, 566
See application file for complete search history.

(56) References Cited

U.S. PATENT DOCUMENTS

| | | | |
|---|---|---|---|
| 129,125 | A | 7/1872 | Gibson |
| 820,789 | A | 5/1906 | Hutchins |
| 879,892 | A | 2/1908 | Packard |
| 1,181,145 | A | 5/1916 | Larson |
| 1,308,613 | A | 7/1919 | Anderson |
| 1,335,267 | A | 3/1920 | Ambrose |
| 1,400,533 | A | 12/1921 | Engel |
| 1,492,878 | A | 5/1924 | Eklundh |
| 1,593,918 | A | 7/1926 | Stanton |
| 1,618,538 | A | 2/1927 | Kittinger |
| 1,756,483 | A | 4/1930 | Estep |
| 1,766,514 | A | 6/1930 | Henry |
| 1,806,100 | A | 5/1931 | Thompson |
| 1,853,805 | A | 4/1932 | Elder |
| 1,881,409 | A | 10/1932 | Le Moon |
| 1,938,838 | A | 12/1933 | Jacobson |
| 1,964,225 | A | 6/1934 | Sumner |
| 1,968,396 | A | 7/1934 | Hollingworth |
| 1,983,929 | A * | 12/1934 | Buelna et al. ................. 239/236 |
| 2,002,178 | A | 5/1935 | Henry |

(Continued)

*Primary Examiner* — Steven J Ganey
(74) *Attorney, Agent, or Firm* — R. Reams Goodloe, Jr.

(57) ABSTRACT

A sprinkler. A sprinkler nozzle assembly is coupled to a base for rotating movement. A stationary cam with cam surface engages a cam follower which open and close valves to regulate water flow as selected angles of rotation. In an embodiment, a pop-up sprinkler is provided, and the moving components are part of the riser. A turbine drive mechanism is coupled to an upper housing on which a plurality of sprinkler nozzle assemblies are affixed. The drive mechanism includes water driven impeller and a gear train adapted for operatively driving the upper housing, and associated sprinkler nozzle assemblies.

22 Claims, 11 Drawing Sheets

(56) References Cited

U.S. PATENT DOCUMENTS

| | | |
|---|---|---|
| 2,009,478 A | 7/1935 | Coles et al. |
| 2,032,064 A | 2/1936 | Meng |
| 2,047,348 A | 7/1936 | Wilson |
| 2,090,284 A | 8/1937 | Carlson |
| 2,221,878 A | 11/1940 | Nelson |
| 2,305,210 A | 12/1942 | Wahlin |
| 2,393,091 A | 1/1946 | Lacy-Mulhall |
| 2,414,052 A | 1/1947 | Martin |
| 2,560,662 A | 1/1951 | Rieger |
| 2,571,763 A | 10/1951 | Robbins |
| 2,595,114 A | 4/1952 | Wieseltier |
| 2,600,987 A | 6/1952 | Gallice |
| 2,601,559 A | 6/1952 | Riblet |
| 2,619,388 A | 11/1952 | Wahlin |
| 2,634,163 A | 4/1953 | Double |
| 2,654,635 A | 10/1953 | Lazzarini |
| 2,723,157 A | 11/1955 | Thompson |
| 2,729,295 A | 1/1956 | Edwards |
| 2,739,839 A | 3/1956 | Greener et al. |
| 2,756,099 A | 7/1956 | Reynolds, Jr. |
| 2,808,732 A | 10/1957 | Champion, Sr. |
| 2,814,526 A | 11/1957 | Blair |
| 2,895,681 A | 7/1959 | Kachergis |
| 2,902,888 A | 9/1959 | Powischill et al. |
| 2,909,325 A | 10/1959 | Hunter |
| 2,999,643 A | 9/1961 | Kennedy |
| 3,026,044 A | 3/1962 | Kennedy |
| 3,035,777 A | 5/1962 | Bodell et al. |
| 3,035,778 A | 5/1962 | Kimbro et al. |
| 3,090,563 A | 5/1963 | Cheeseboro |
| 3,095,148 A | 6/1963 | Smith |
| 3,104,818 A | 9/1963 | Ballard et al. |
| 3,107,056 A | 10/1963 | Hunter |
| 3,111,268 A | 11/1963 | Butler |
| 3,116,651 A | 1/1964 | Hardy |
| 3,131,867 A | 5/1964 | Miller et al. |
| 3,139,901 A | 7/1964 | Camp |
| 3,141,909 A | 7/1964 | Mayo, Jr. |
| 3,272,437 A | 9/1966 | Coson |
| 3,321,138 A | 5/1967 | Curry |
| 3,383,047 A | 5/1968 | Hauser |
| 3,391,868 A | 7/1968 | Cooney |
| 3,398,894 A | 8/1968 | D'Agaro |
| 3,424,381 A | 1/1969 | Best |
| 3,428,256 A | 2/1969 | Painter |
| 3,451,623 A | 6/1969 | Dibrell |
| 3,452,930 A | 7/1969 | Karbo |
| 3,464,628 A | 9/1969 | Chow |
| 3,508,711 A | 4/1970 | Switall |
| 3,515,351 A | 6/1970 | Costa |
| 3,528,093 A | 9/1970 | Eerkens |
| 3,574,336 A | 4/1971 | Epple |
| 3,578,248 A | 5/1971 | Congdon |
| 3,580,506 A | 5/1971 | Costa |
| 3,580,514 A | 5/1971 | Radecki |
| 3,583,638 A | 6/1971 | Eby |
| 3,625,429 A | 12/1971 | Turrell |
| 3,645,451 A | 2/1972 | Hauser |
| 3,648,928 A | 3/1972 | Lindgren |
| 3,654,817 A | 4/1972 | Kane |
| 3,703,993 A | 11/1972 | Schreiner |
| 3,724,757 A | 4/1973 | Hunter |
| 3,727,842 A | 4/1973 | Ertsgaard et al. |
| 3,791,581 A | 2/1974 | Chow |
| 3,791,585 A | 2/1974 | Warren |
| 3,794,245 A | 2/1974 | Wilson |
| 3,854,664 A | 12/1974 | Hunter |
| 3,871,582 A | 3/1975 | Biddle |
| 3,878,990 A | 4/1975 | Geraudie |
| 3,884,416 A | 5/1975 | King |
| 3,915,383 A | 10/1975 | King |
| 3,921,191 A | 11/1975 | Merrin |
| 3,921,910 A | 11/1975 | Hayes et al. |
| 3,924,809 A | 12/1975 | Troup |
| 3,952,954 A | 4/1976 | Taylor |
| 3,960,327 A | 6/1976 | Olson |
| 3,977,063 A | 8/1976 | Bruninga |
| 4,002,295 A | 1/1977 | Drori |
| 4,004,612 A | 1/1977 | Hummel, Jr. et al. |
| 4,019,686 A | 4/1977 | Palma |
| 4,026,471 A | 5/1977 | Hunter |
| 4,055,205 A | 10/1977 | Withoff et al. |
| 4,113,181 A | 9/1978 | Sheets |
| 4,119,275 A | 10/1978 | Hunter |
| 4,186,880 A | 2/1980 | Jacobi et al. |
| 4,189,099 A | 2/1980 | Bruninga |
| 4,198,000 A | 4/1980 | Hunter |
| 4,198,001 A | 4/1980 | Rodriguez |
| 4,201,334 A | 5/1980 | Janik |
| 4,201,344 A | 5/1980 | Lichte |
| 4,220,283 A | 9/1980 | Citron |
| 4,245,786 A | 1/1981 | Abrahamsen et al. |
| 4,253,608 A | 3/1981 | Hunter |
| 4,265,403 A | 5/1981 | Bonetti |
| 4,269,354 A | 5/1981 | DeWitt |
| 4,272,024 A | 6/1981 | Kah, Jr. |
| 4,277,029 A | 7/1981 | Rabitsch |
| 4,281,793 A | 8/1981 | DeWitt |
| 4,316,579 A | 2/1982 | Ray et al. |
| 4,353,506 A | 10/1982 | Hayes |
| 4,398,666 A | 8/1983 | Hunter |
| 4,399,999 A | 8/1983 | Wold |
| 4,417,691 A | 11/1983 | Lockwood |
| 4,429,832 A | 2/1984 | Sheets |
| 4,453,673 A | 6/1984 | Icenbice |
| 4,462,545 A | 7/1984 | Lourenco |
| 4,471,907 A | 9/1984 | Gerstmann |
| 4,471,908 A | 9/1984 | Hunter |
| 4,474,328 A | 10/1984 | Hale |
| 4,496,104 A | 1/1985 | Ducasse |
| 4,501,391 A | 2/1985 | Hunter |
| 4,538,762 A | 9/1985 | Lemkin |
| 4,540,125 A | 9/1985 | Gorney et al. |
| 4,568,024 A | 2/1986 | Hunter |
| 4,613,077 A | 9/1986 | Aronson |
| 4,624,412 A | 11/1986 | Hunter |
| 4,625,914 A | 12/1986 | Sexton et al. |
| 4,637,549 A | 1/1987 | Schwartzman |
| 4,646,224 A | 2/1987 | Ransburg et al. |
| 4,648,558 A | 3/1987 | Rabitsch |
| 4,681,259 A | 7/1987 | Troup |
| 4,681,260 A | 7/1987 | Cochran |
| 4,687,137 A | 8/1987 | Boger et al. |
| 4,718,605 A | 1/1988 | Hunter |
| 4,739,934 A | 4/1988 | Gewelber |
| 4,739,997 A | 4/1988 | Smetana |
| 4,763,838 A | 8/1988 | Holcomb |
| 4,766,709 A | 8/1988 | Galbraith |
| 4,773,595 A | 9/1988 | Livne |
| 4,781,327 A | 11/1988 | Lawson et al. |
| 4,796,809 A | 1/1989 | Hunter |
| 4,796,811 A | 1/1989 | Davisson |
| 4,819,875 A | 4/1989 | Beal |
| 4,834,289 A | 5/1989 | Hunter |
| 4,836,449 A | 6/1989 | Hunter |
| 4,836,450 A | 6/1989 | Hunter |
| 4,836,458 A | 6/1989 | Cavagna |
| 4,867,379 A | 9/1989 | Hunter |
| 4,892,252 A | 1/1990 | Bruninga |
| 4,907,742 A | 3/1990 | Whitehead et al. |
| 4,913,351 A | 4/1990 | Costa |
| 4,961,534 A | 10/1990 | Tyler et al. |
| 4,984,740 A | 1/1991 | Hodge |
| 5,009,368 A | 4/1991 | Streck et al. |
| 5,031,840 A | 7/1991 | Grundy et al. |
| 5,039,013 A | 8/1991 | Sawade et al. |
| 5,056,699 A | 10/1991 | Newbold et al. |
| 5,058,806 A | 10/1991 | Rupar |
| RE33,823 E | 2/1992 | Nelson et al. |
| 5,123,597 A | 6/1992 | Bendall |
| 5,154,348 A | 10/1992 | Ratnik et al. |
| 5,248,093 A | 9/1993 | Pleasants |
| 5,248,095 A | 9/1993 | Rankin et al. |
| 5,267,689 A | 12/1993 | Forer |

(56) References Cited

U.S. PATENT DOCUMENTS

| | | |
|---|---|---|
| 5,280,854 A | 1/1994 | Das |
| 5,297,607 A | 3/1994 | Beauchamp |
| 5,328,178 A | 7/1994 | Nies |
| 5,333,785 A | 8/1994 | Dodds et al. |
| 5,366,157 A | 11/1994 | Pleasants |
| 5,370,311 A | 12/1994 | Chen |
| 5,375,768 A | 12/1994 | Clark |
| 5,423,486 A | 6/1995 | Hunter |
| 5,598,977 A | 2/1997 | Lemme |
| 5,636,793 A | 6/1997 | Gurevitch |
| 5,647,541 A | 7/1997 | Nelson |
| 5,710,887 A | 1/1998 | Chelliah et al. |
| 5,711,486 A | 1/1998 | Clark et al. |
| 5,774,870 A | 6/1998 | Storey |
| 5,845,849 A | 12/1998 | Mitzlaff |
| 6,079,637 A | 6/2000 | Ohayon |
| 6,158,675 A | 12/2000 | Ogi |
| 6,241,158 B1 | 6/2001 | Clark et al. |
| 6,332,581 B1 | 12/2001 | Chin et al. |
| 6,402,048 B1 | 6/2002 | Collins |
| 6,491,235 B1 | 12/2002 | Scott et al. |
| 6,494,385 B1 | 12/2002 | Chen |
| 6,651,905 B2 | 11/2003 | Sesser et al. |
| 6,688,539 B2 | 2/2004 | Vander Griend |
| 6,695,223 B2 | 2/2004 | Beutler et al. |
| 6,732,950 B2 | 5/2004 | Ingham, Jr. et al. |
| 6,732,952 B2 | 5/2004 | Kah, Jr. |
| 6,736,332 B2 | 5/2004 | Sesser et al. |
| 6,814,304 B2 | 11/2004 | Onofrio |
| 6,817,543 B2 | 11/2004 | Clark |
| 6,827,291 B2 | 12/2004 | Townsend |
| 6,834,814 B1 | 12/2004 | Beckman |
| 6,834,816 B2 | 12/2004 | Kah, Jr. |
| 6,837,448 B2 | 1/2005 | Han et al. |
| 6,921,029 B2 | 7/2005 | Lockwood |
| 7,090,146 B1 | 8/2006 | Ericksen et al. |
| 7,631,813 B1 | 12/2009 | Lichte et al. |
| 7,828,230 B1 | 11/2010 | Anuskiewicz et al. |
| 8,074,897 B2 | 12/2011 | Hunnicutt et al. |
| 8,113,443 B2 * | 2/2012 | Zur ............................ 239/240 |
| 8,636,230 B1 * | 1/2014 | Clark et al. .................. 239/242 |
| 2005/0194465 A1 | 9/2005 | Wang |

\* cited by examiner

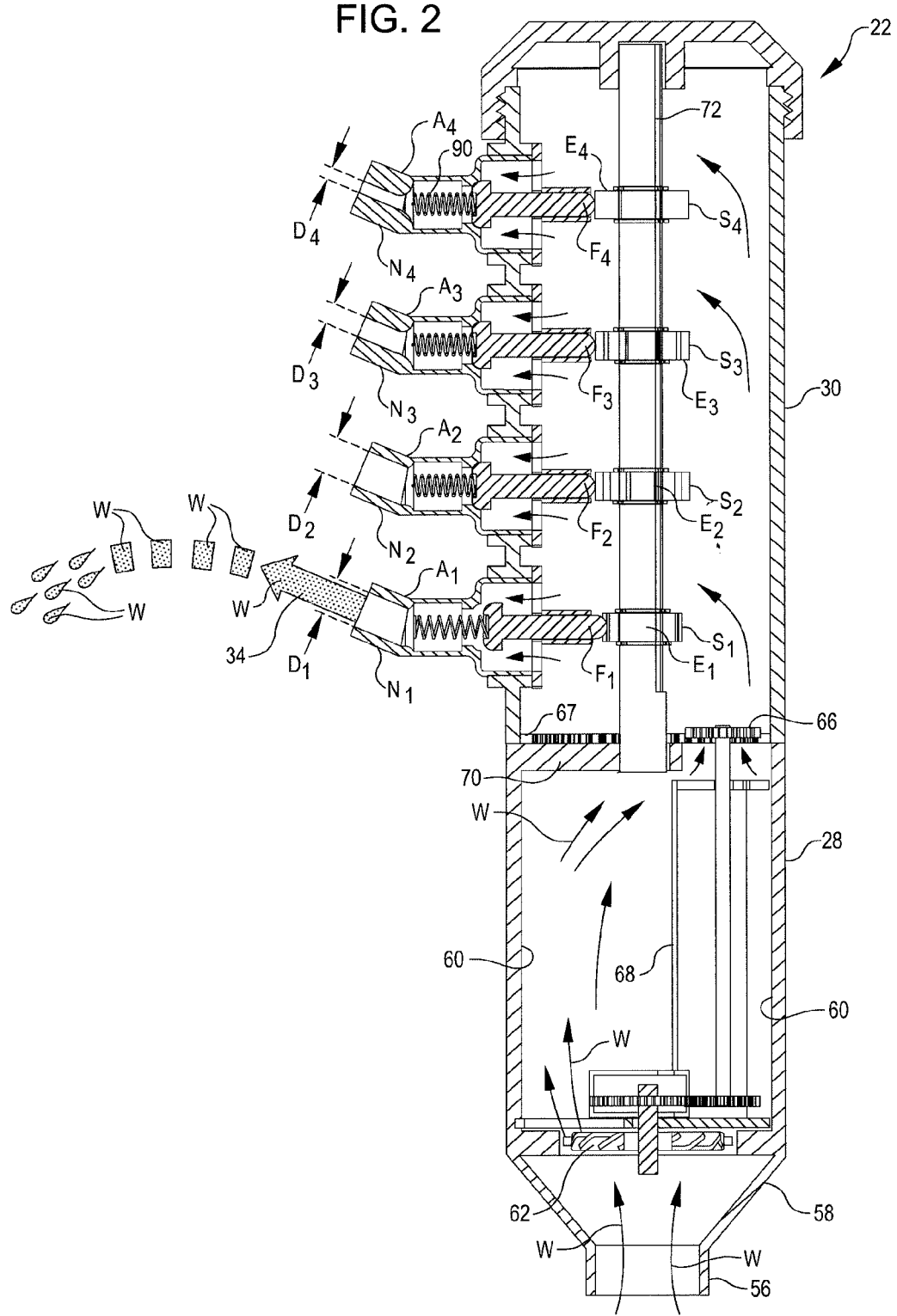

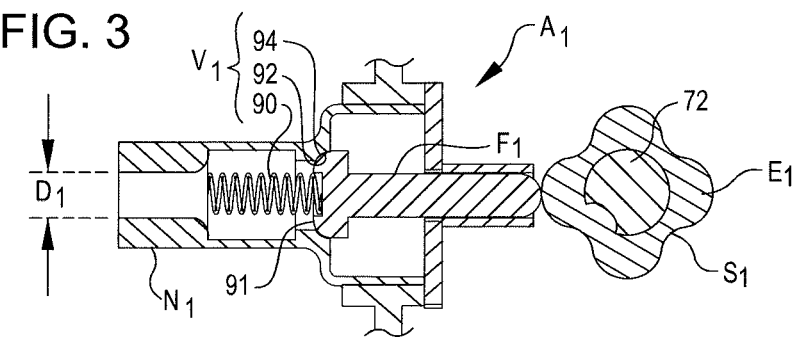
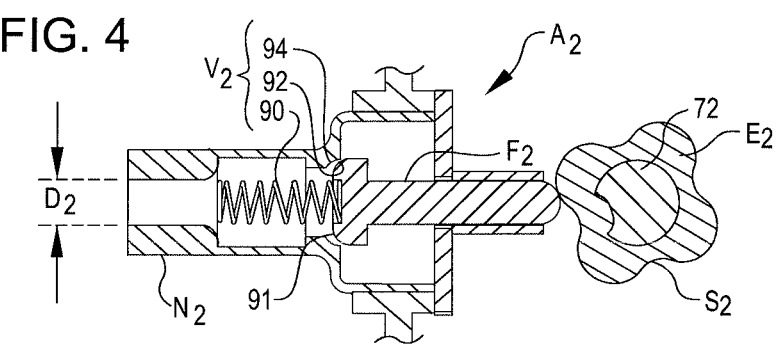
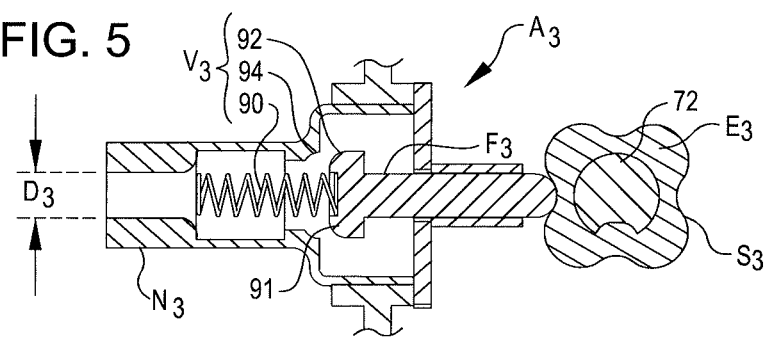

MULTI-NOZZLE CAM DRIVEN SPRINKLER HEAD

RELATED PATENT APPLICATIONS

This application claims priority from prior U.S. Provisional Patent Application Ser. No. 61/799,760, filed Mar. 15, 2013, entitled MULTI-NOZZLE CAM DRIVEN SPRINKLER HEAD, the disclosure of which is incorporated herein in its entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to lawn sprinklers, and more particularly, to lawn sprinklers adapted for use in watering a water receiving area having a non-uniform shape.

BACKGROUND

Water sprinklers of various designs have been utilized for many years. However, many of the currently utilized sprinklers are designed to provide water over a circular area that is of relatively uniform diameter. A few designs have the ability to water over selected receiving areas that are shaped as relatively circular arc portions. One of my prior patents, namely U.S. Pat. No. 7,988,071, issued Aug. 2, 2011, for a LAWN SPRINKLER, the disclosure of which is incorporated herein in its entirety by this reference, provides designs for attacking some aspects of the problem of watering irregularly shaped parcels.

However, significant amounts of water are wasted due to the inability of the general public to obtain and install lawn sprinklers that are capable of watering non-uniform or irregularly shaped areas specifically and exclusively where water is needed, rather than applying a water stream relatively indiscriminately over an area that may include features where water is not required, such as driveways or sidewalks.

Since water is increasingly scarce and/or increasingly costly in many locales (whether as a result of increased fees from the utility provider, or as a result of energy costs for pumping, or otherwise) there remains a need for a lawn sprinkler apparatus that can reliably provide the needed water over the required area, while minimizing or eliminating the application of water to adjacent areas which do not require the application of water.

Thus, there remains an unmet need for an improved lawn sprinkler with suitable features and mechanical workings that would direct available water to those areas needing water, while avoiding application of water to those areas which do not require watering.

SUMMARY

A lawn sprinkler has now been developed with water distribution nozzles that are provided with water via valves that are opened and closed according to a predefined pattern. By using such a lawn sprinkler apparatus, the volume of water actually applied to a particular portion of a lawn is appropriate for the size and shape of the area that is watered, even when the water is applied over an area having a non-circular shape or irregular geometric pattern.

In one embodiment, the sprinkler apparatus includes a base configured to confiningly receive a pressurized water flow, and a sprinkler nozzle assembly coupled to the base for rotating movement with respect to the base. In an embodiment, the sprinkler nozzle assembly may be configured as a riser in a pop-up sprinkler, responsive to a pressurized water flow to pop-up into an operating position for discharge of water from a nozzle. However, the sprinkler may be utilized with or without a base for pop-up operation. A turbine drive mechanism is coupled to an upper housing on which a plurality of sprinkler nozzle assemblies are affixed. The drive mechanism includes water driven impeller and a gear train adapted for operatively driving the upper housing, and associated sprinkler nozzle assemblies, in rotary movement.

One or more cam operated valves V, and in various embodiments, a plurality of cam operated water flow valves $V_1$, $V_2$, $V_3$, etc., are provided to regulate the water flow outward from the nozzle in a predetermined pattern consistent with the size and shape of the area to be watered. A vertically oriented cam shaft includes cam surfaces, which in an embodiment may be provided by cam elements, complementary to adjacently mounted water flow valves. In an embodiment, water flow valves are provided in a normally open position, wherein a spring urges the valve toward an open position. Thus, the cam surface urges the valve toward a closed position, by compression of the spring, until the valve is closed.

A water outlet nozzle is provided to deliver water in a given direction, generally in a preselected area pattern. In an embodiment, the drive mechanism may be operative to open and close the water flow valves in response to the cam mechanism, so that the water outlet nozzles only discharge water in the desired amounts in a selected direction.

The foregoing briefly describes a lawn sprinkler apparatus having valves to regulate the flow of water to provide a substantially uniform quantity of water per unit area of lawn, even in non-circular or irregular geometric shapes. However, the developments described herein will be more readily understood upon consideration of the following detailed description, taken in conjunction with careful examination of the accompanying figures of the drawing.

BRIEF DESCRIPTION OF DRAWING

In order to enable the reader to attain a more complete appreciation of the developments described herein, such developments will be described by way of exemplary embodiments, illustrated in the accompanying drawing figures in which like reference numerals denote like elements, with respect to which mention thereof may not be repeated when using the same numbers or letters with only differing subscripts, for identical but repeated parts, or for very similar parts with only minor differences such as surface shapes of cams, which usage will be evident in the context of the specification and usage in these drawing figures, and in which:

FIG. 2 provides a vertical cross section of an embodiment of a lawn sprinkler for watering an irregular shaped lawn area, showing a turbine driven upper housing with stationary cam shaft which holds individual cams having unique cam surfaces that open and close valves, which in turn allocate water to selected nozzles.

FIG. 3 provides a cross sectional diagrammatic view of a nozzle and spring loaded valve which is actuated by a cam follower, where the cam follower is moved linearly in response to the shaped surface of a cam that is mounted on a cam shaft, and further showing in this figure the spring loaded valve seated, in a closed position.

FIG. 4 provides a cross sectional diagrammatic view of a nozzle and spring loaded valve which is actuated by a cam follower, where the cam follower is moved linearly in response to the shaped surface of a cam that is mounted on a cam shaft, and further showing in this figure the spring loaded valve situated in an unseated, but intermediate position, as may occur during opening or closing of the spring loaded valve.

FIG. 5 provides a cross sectional diagrammatic view of a nozzle and spring loaded valve which is actuated by a cam follower, where the cam follower is moved linearly in response to the shaped surface of a cam that is mounted on a cam shaft, and further showing in this figure the spring loaded valve seated, in an open position, in which water may pass through the valve and outward through the nozzle.

Figure 1:
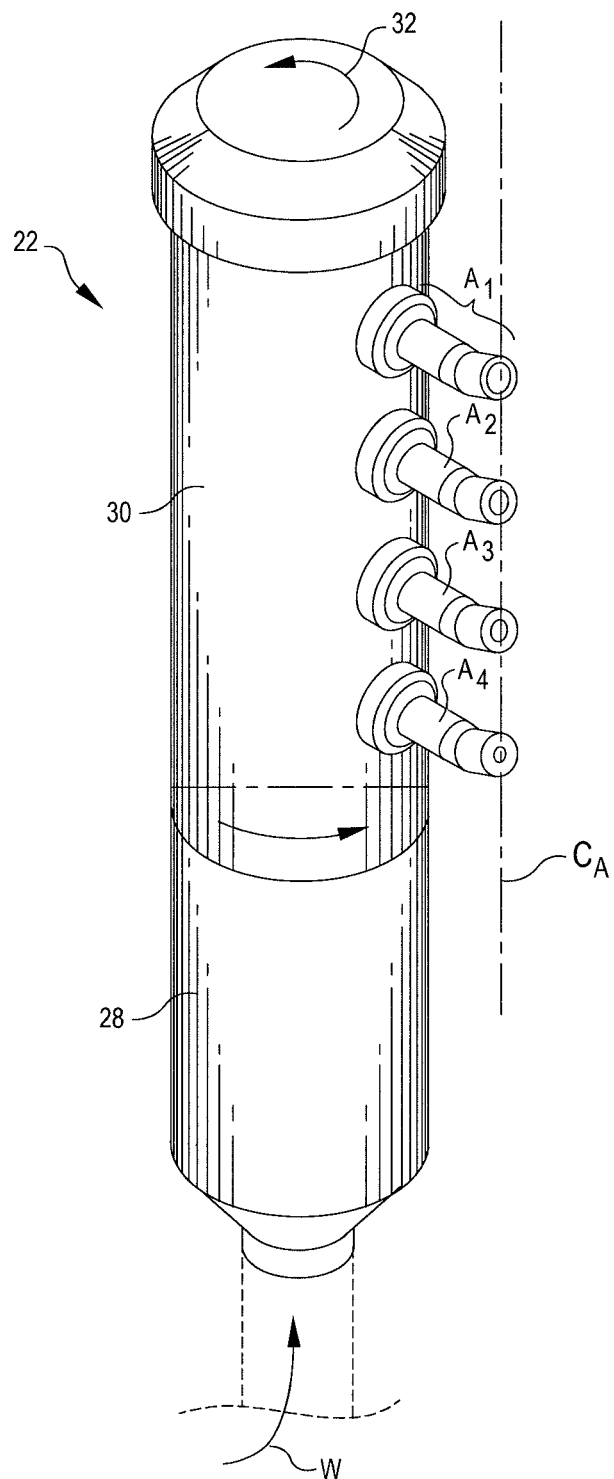
FIG. 1 provides a perspective view of an embodiment for a lawn sprinkler for watering an irregular shaped lawn area, showing a plurality of nozzles, with nozzles having various diameter outlets, and showing a stationary lower housing and turbine driven upper housing in which the plurality of nozzles are mounted.
Figure 6:
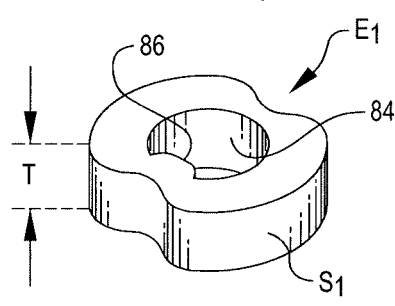
FIG. 6 provides a perspective view of an embodiment for a first cam having a first shaped surface, where a first shaped surface corresponds to watering needs of a shaped parcel of land to be watered, and with the cam including a key portion to match a keyway provided in a camshaft on which the cam is mounted.
Figure 7:
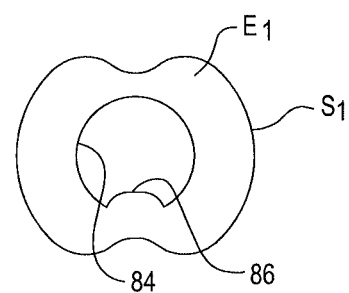
FIG. 7 provides a top plan view of an embodiment for a first cam having a first shaped surface, where a first shaped surface corresponds to watering needs of a shaped parcel of land to be watered, and with the cam including a key portion to match a keyway provided in a camshaft on which the cam is mounted.
Figure 8:
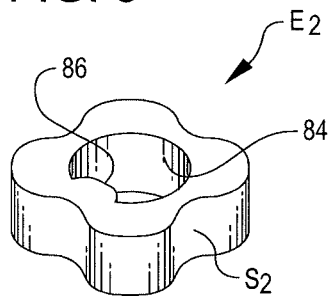
FIG. 8 provides a perspective view of another embodiment, showing a second cam having a second shaped surface, where the second shaped surface corresponds to watering needs of a shaped parcel of land to be watered, and with the second cam including a key portion to match a keyway provided in a camshaft on which the second cam is mounted.
Figure 9:
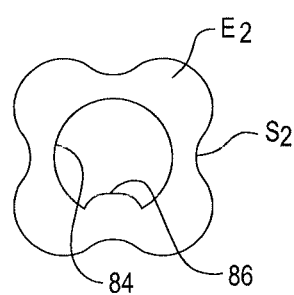
FIG. 9 provides a top plan view of another embodiment, showing a second cam having a second shaped surface, where the second shaped surface corresponds to watering needs of a shaped parcel of land to be watered, and with the second cam including a key portion to match a keyway provided in a camshaft on which the second cam is mounted.

The foregoing figures, being merely exemplary, contain various elements that may be present or omitted from actual apparatus that may be constructed to provide various embodiments for covers for rotating sprinklers, or to various configurations for operation thereof, or to methods for use thereof. An attempt has been made to draw the figures in a way that illustrates at least those elements that are significant for an understanding of the components of an embodiment for useful multi-cam sprinklers as taught herein. However, various other elements for such apparatus, or for installation and use of the same, may be utilized in order to provide useful embodiments for covers for sprinklers, particularly for use on irregularly shaped water receiving parcels, according to the concepts disclosed herein.

In the various figures of the drawing, like features may be illustrated with the same reference numerals, without further mention thereof. Further, the foregoing figures are merely exemplary, and may contain various elements that might be present or omitted from actual implementations of various embodiments depending upon the circumstances. The features as illustrated provide an exemplary embodiment for a sprinkler that may control the amount of water provided to specific locations of a parcel of land, and to water volume applied along a radial length, at the same time, through selection of nozzle characteristics, and to regulation of the amount of water provided to such nozzles through a cam controlled valve. An attempt has been made to draw the figures in a way that illustrates at least those elements that are significant for an understanding of the various embodiments and aspects of the invention. However, various other elements of a lawn sprinkler with valve and sprinkler assembly designs, or gear train designs, especially as applied for different variations of the functional components illustrated, as well as different embodiments such as a shape of components or final design of various elements, may be utilized in order to provide a useful, reliable, lawn sprinkler design constructed according to the designs described herein, that may be useful for minimizing waste of water, and in normalizing the application rate of water (on an irrigation volume per square foot or similar basis) over areas of a lawn, particularly for irregular or other non-circular lawn shapes.

DETAILED DESCRIPTION

Figure 19:
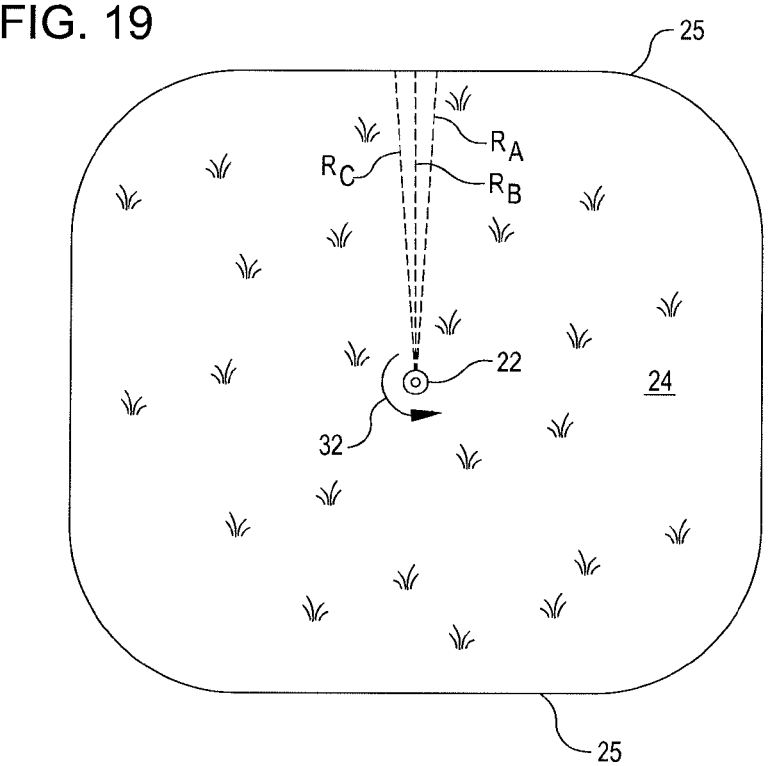
FIG. 19 is a plan view of a non-circular lawn area that is to be watered, preferably with a relatively uniform volume of water per square foot of lawn wherever located, via a rotating sprinkler that provides water substantially along vectors of differing radial lengths from the sprinkler, showing watering along short vectors, where the amount of water delivered along the radial vector will be decreased.
Figure 20:
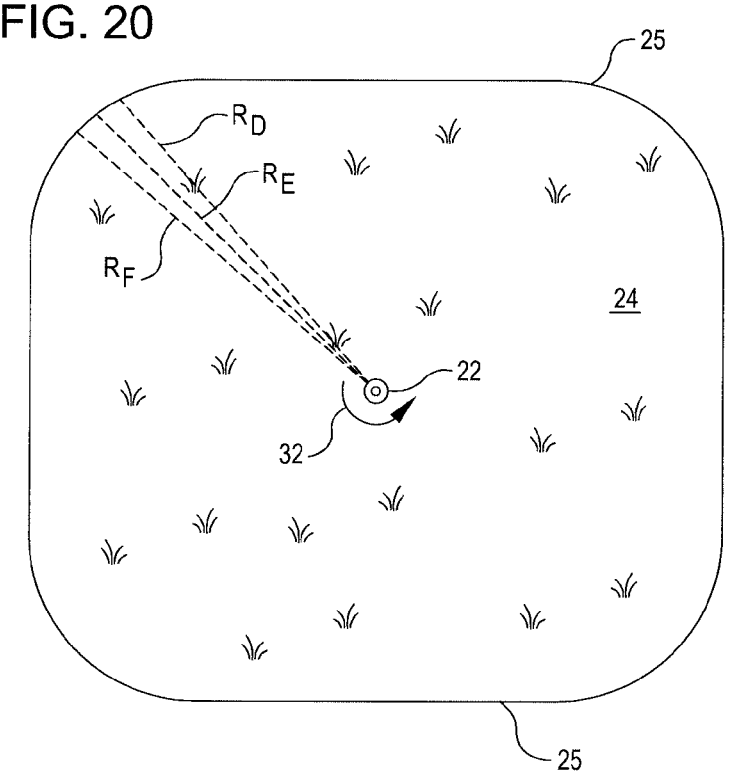
FIG. 20 is a plan view of the non-circular lawn area just illustrated in FIG. 19 above, now showing watering along longer radial lengths from the rotating sprinkler, which as described herein will preferably be provided with a substantially uniform volume of water per square foot of lawn, wherever located, from the sprinkler nozzle assemblies provided on the sprinkler.

Attention is directed to FIG. 1 of the drawing, which provides a perspective view of an exemplary sprinkler 22 for watering a non-circular, irregular shaped lawn, such as lawns illustrated in FIGS. 19 and 20. In FIGS. 19, and 20, it can be seen that sprinkler 22 is set up to water non-circular parcel of land 24. In such parcel 24, it can be seen that when sprinkler 22 is watering along relatively short radials $R_A$, $R_B$, and $R_C$, the amount of water is needed along such radial lengths per unit of time is not as much as would be required for the same unit of time along the longer radial lengths $R_D$, $R_E$, and $R_F$ as shown in FIG. 20. To address this problem, we have developed a novel sprinkler 20 in which a base 28 is provided having an upper housing 30 rotatably attached thereto. In an embodiment, the upper housing 30 may be set up mechanically to rotate in a selected direction as indicated by reference arrow 32 in FIG. 1. As upper housing 30 rotates, the water flow rate 34 from nozzles N (see FIG. 2) increases or decreases, or says constant, or stays off, as required in order to regulate, limit, or prevent water from being delivered nozzles N. For the watering of relatively short radials $R_A$, $R_B$, and $R_C$ as shown in FIG. 19, the amount of water provided through nozzles N may be reduced, during the time that the group of nozzles N rotates through such angular direction(s). For the watering of relatively long radial lengths $R_D$, $R_E$, and $R_F$, the water flow rate 34 increases, in order to provide more water to the nozzles N for watering along the relatively longer radials $R_D$, $R_E$, and $R_F$. Novel construction of sprinkler 22, which enables such metered delivery of water to a parcel of land 24 will be further described below.

Attention is directed to FIG. 1, which shows a vertical perspective view for an embodiment of sprinkler 22. The sprinkler 22 includes a base 28, which relative to upper housing 30 is stationary.

Figure 16:
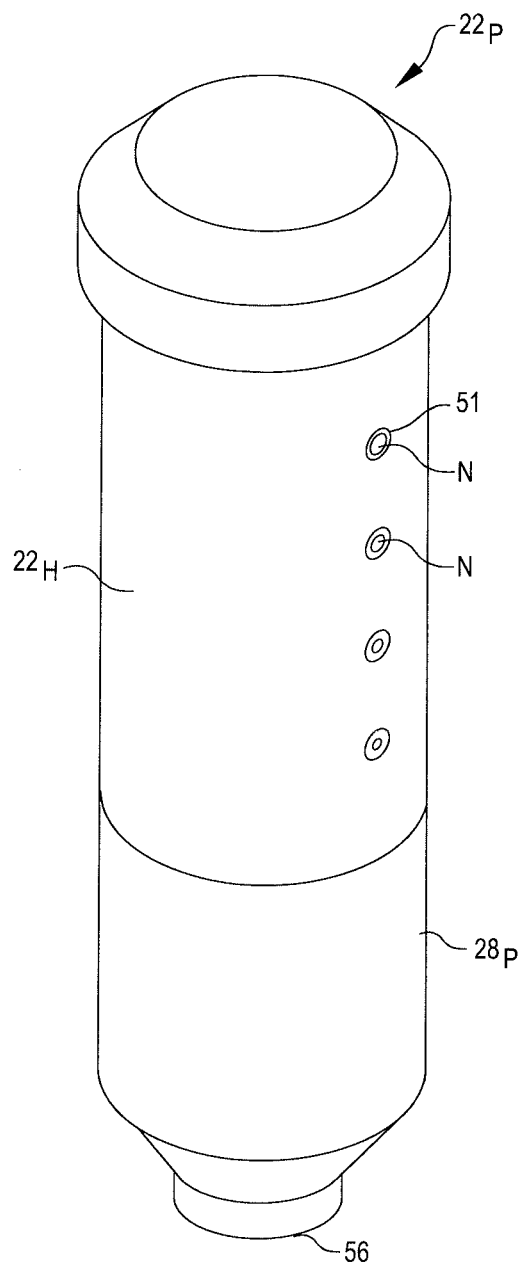
FIG. 16 shows another embodiment for a lawn sprinkler for watering an irregular shaped lawn area, showing a plurality of nozzles, with nozzles having various diameter outlets, and showing a stationary lower housing, and a turbine driven upper housing in which the plurality of nozzles are mounted, and further providing an outer cover for the upper housing, so that only the outlets of the plurality of nozzles are visible.
Figure 18:
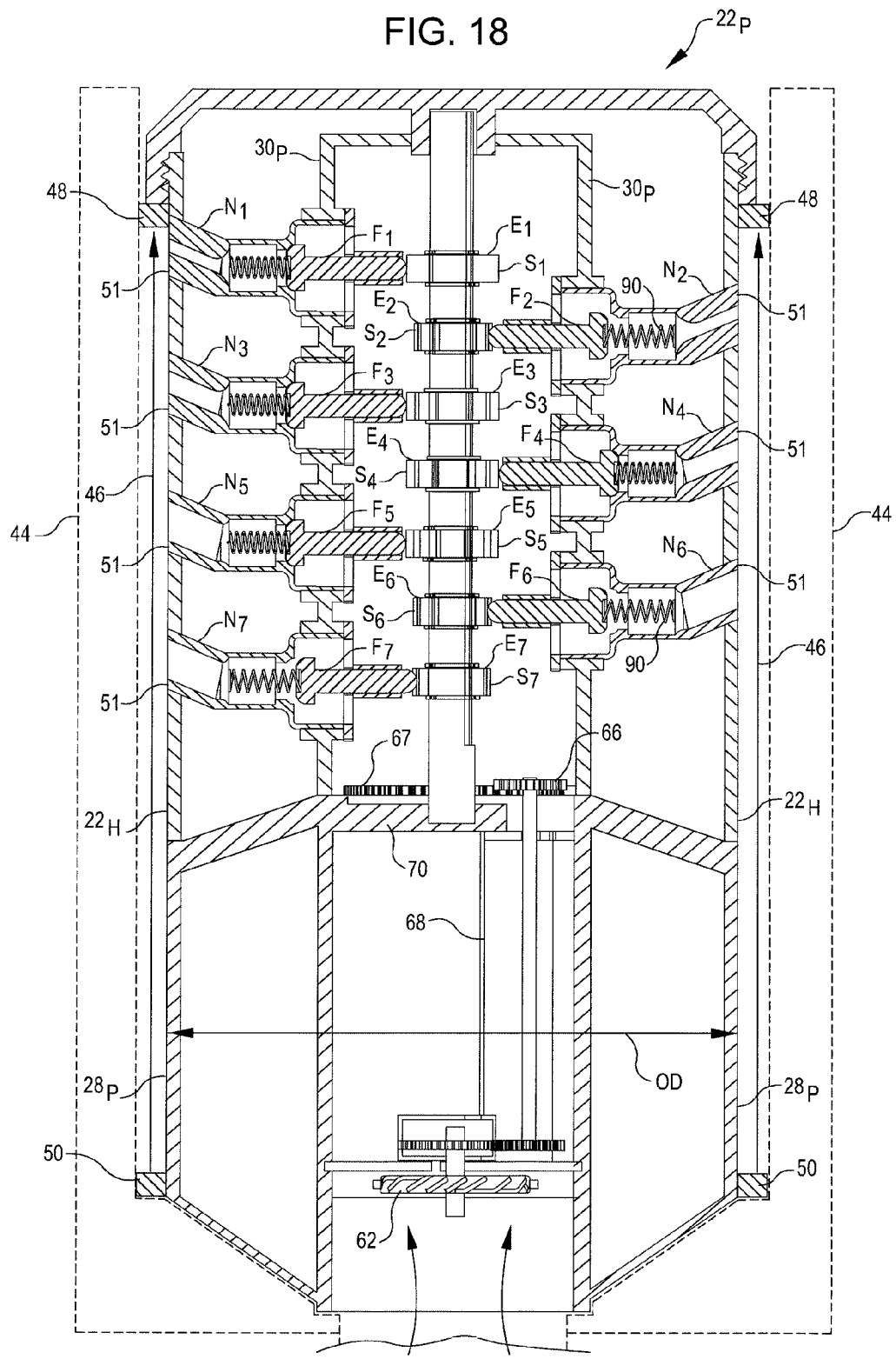
FIG. 18 provides a vertical cross-sectional view of yet another embodiment for a lawn sprinkler for watering an irregular shaped lawn area, showing a first group of nozzles on a first side and a second group of nozzles on a second side, with various nozzles in each group having various diameter outlets as suitable for projecting water different distances, and also showing a stationary lower housing, and a turbine driven upper housing on which the first group and second group of nozzles are mounted, and further providing an outer cover for the upper housing, so that only the outlets of the plurality of nozzles are visible.

Note, however, as mentioned below and shown in FIG. 18, an apparatus such as sprinkler 22 may be fitted with an outer housing $22_H$ surrounding upper housing $30_P$, and slidingly secured in a pressurizable receiver 44 (shown in broken lines in FIG. 18) that is sized and shaped to receive at least a pop-up base $28_P$ therein, to vertically house and slidingly cradle the pop-up base $28_P$. In such a pop-up configuration, upon pressurization by water, the base $28_P$ rises vertically in the direction of reference arrows 46 from the pressurizable receiver 44, to provide a pop-up sprinkler $22_P$. Seals 48 such as o-rings and end stops 50, and/or other working elements may be provided in a conventional manner for pop-up sprinklers, as known to those of skill in the art, and need not be further addressed herein. As seen in FIG. 16, and more clearly indicated in FIG. 18, in an embodiment, the outer housing 22H may be cylindrical in shape. In an embodiment, the outer housing 22H has an outer diameter OD approximately corresponding to the spacing between distal ends 51 of nozzles N in first group A and second group B of nozzles N, which are oriented at one hundred eighty degrees (180°) from each other.

Returning now to FIG. 1, a rotatable upper housing 30 is mounted on sprinkler base 28. At least one sprinkler nozzle assembly $A_1$ is secured to and rotatable with the upper housing 30. In most embodiments, a plurality of nozzle assemblies such as nozzle assemblies $A_1$, $A_2$, $A_3$, and $A_4$ as shown in FIG. 1, will be provided. In various embodiments, nozzle assemblies may be provided in groups. For example, nozzle assemblies $A_1$, $A_2$, $A_3$, and $A_4$ constitute a first or A group of nozzle assemblies. In an embodiment a group may arranged in a vertically aligned fashion, as shown in FIG. 1, where $A_1$, $A_2$, $A_3$, and $A_4$ are located one above the other, along vertical centerline $C_A$. In various embodiments, pressurized water may enter at the bottom inlet 56 as indicated by reference arrow W.

Figure 10:
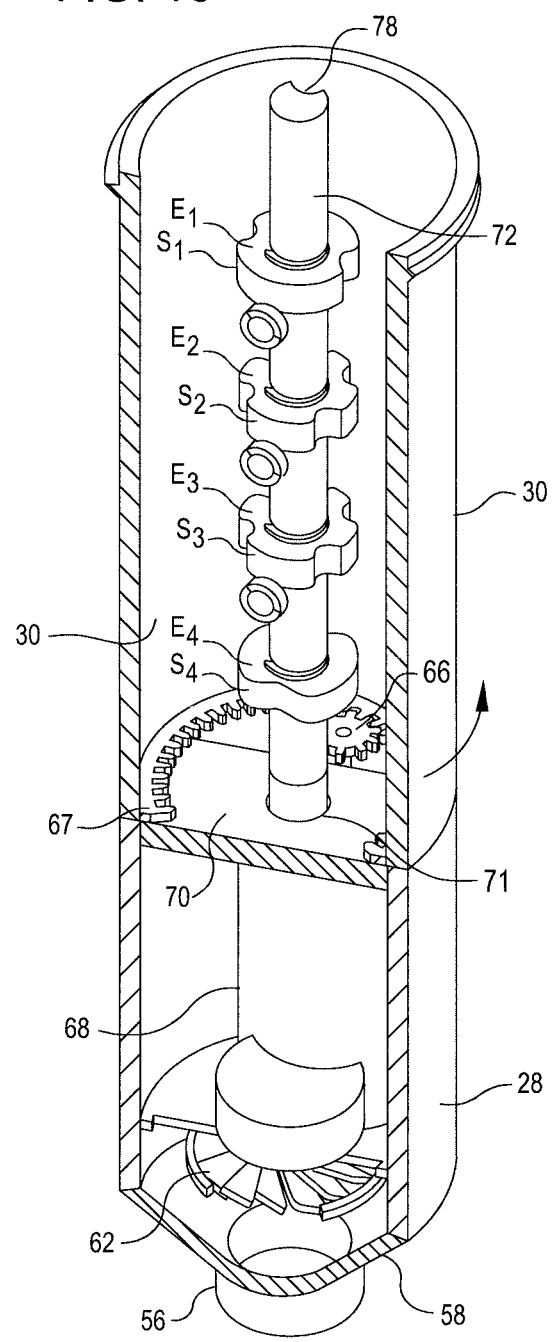
FIG. 10 provides a perspective of a vertical cross-sectional view of an embodiment for a lawn sprinkler for watering an irregular shaped lawn area, showing a plurality of cams mounted on a vertical stationary cam shaft, and an annular gear for driving the upper housing, which annular gear is driven by a pinion gear, which in turn is driven by a shaft and gear train driven by a water turbine mounted at the inlet to the sprinkler.
Figure 11:
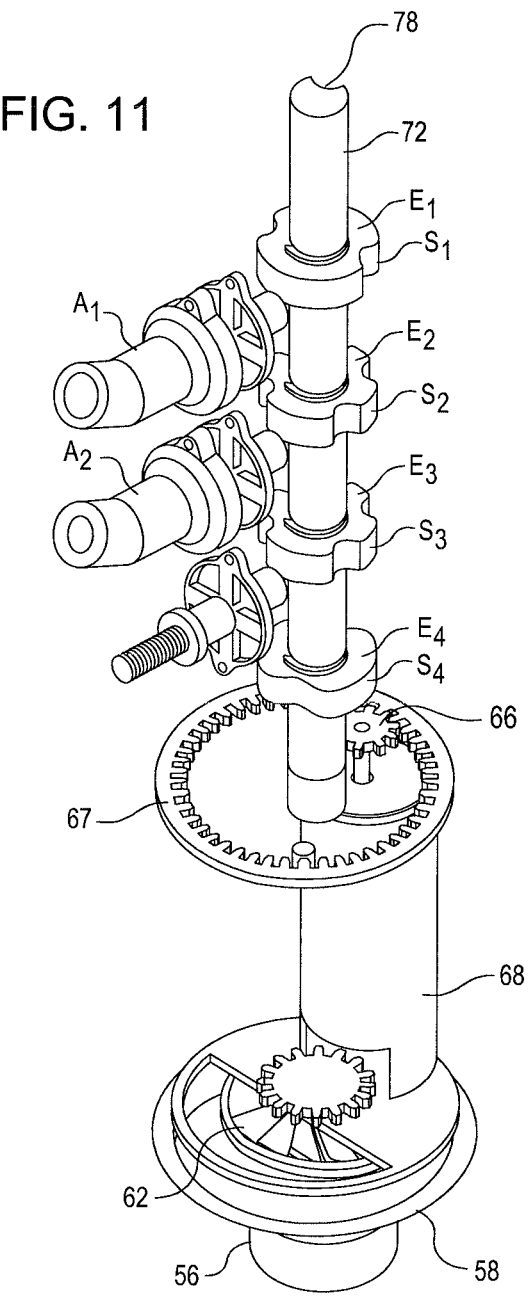
FIG. 11 provides a partial perspective view of an embodiment for a lawn sprinkler for watering an irregular shaped lawn area, showing only key working parts, including a plurality of cams mounted on a vertical stationary cam shaft, with cam follower and valves leading to outlet nozzles, and also showing an annular gear for driving the upper housing (not shown), which annular gear is driven by a pinion gear, which in turn is driven by a shaft and gear train driven by a water turbine mounted at the inlet to the sprinkler.
Figure 15:
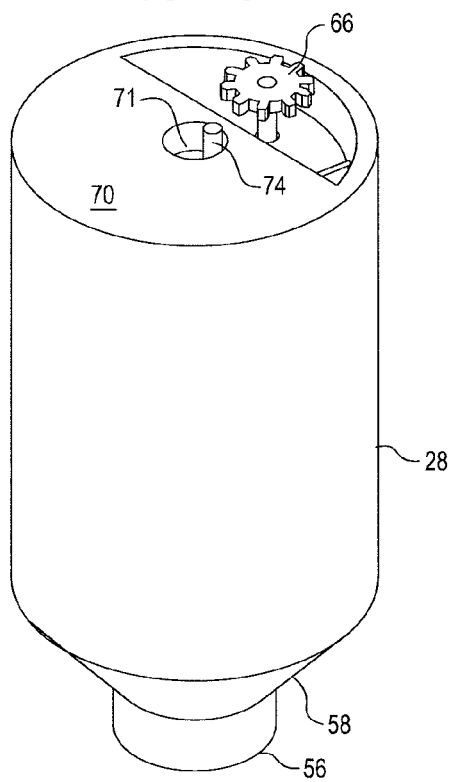
FIG. 15 provides a perspective view of a stationary lower housing, showing a cam mounting plate with key for mating engagement with a keyway in a cam shaft to secure the cam shaft against rotation, and also showing an opening between the cam mounting plate and outer sidewalls of the stationary lower housing for upward flow of water.

Attention is directed to FIG. 2, which shows a vertical cross sectional view of an embodiment for a sprinkler 22. Pressurized water W is received at inlet 56 of lower housing 58 of base 28. The lower housing 58 has an inner sidewall 60 that contains pressurized water W. The base 28 has an inlet turbine 62 operably fixed therein. A gear train 64 having an output gear 66 responsive to the inlet turbine 62 is provided. In an embodiment, output gear 66 is a pinion gear that drives annular gear 67 in upper housing 30. In an embodiment, portions of the gear train 64 may be sheltered from flow of water W by a gear housing 68. A mount 70 is supported by the base 28, and has a receiver 71 therein sized and shaped for receiving a stationary cam shaft 72. A stationary cam shaft 72 is affixed to the mount 70, and extends upwardly. As visible in FIG. 15, the mount 70 may include a mounting key 74, which prevents the cam shaft 72 from turning. As visible in the cross-sectional view of cam shaft 72 shown in FIG. 13, in an embodiment, the cam shaft 72 may be provided with an inwardly extending keyway slot 76, which is defined by a vertically extending keyway wall 78, seen in FIGS. 10 and 11.

Figure 12:
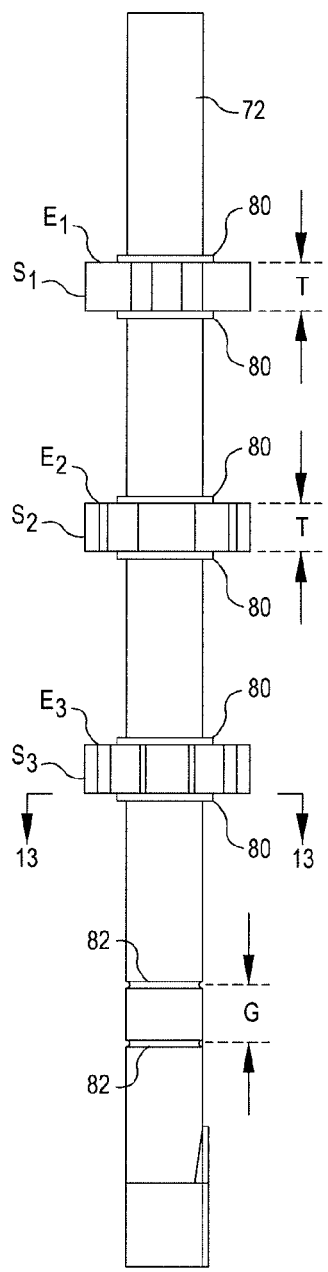
FIG. 12 shows a cam shaft with three cams mounted thereon, and with a location for mounting a fourth cam, and at which lower and upper locating grooves are provided for receiving retaining clips to secure a cam at a selected location.
Figure 13:
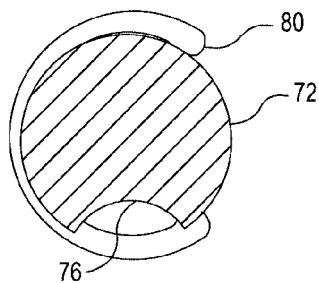
FIG. 13 shows a cross-section of a cam shaft, taken as through section 13-13 of FIG. 12, showing the cam shaft, including keyway defined by a keyway wall, and showing a retaining clip to secure a cam at a selected location.
Figure 14:
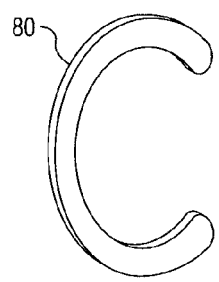
FIG. 14 provides a perspective view of an embodiment for a retaining clip used to retain a cam in a desired location on a cam shaft.

The cam shaft 72 has associated therewith at least one cam surface S. In various embodiments, a plurality of cam surfaces $S_1$, $S_2$, $S_3$, $S_4$, etc., (see the seven cams in FIGS. 17 and 18, for example, which include $S_5$, $S_6$, and $S_7$) and the like are provided by cam elements $E_1$, $E_2$, $E_3$, $E_4$, (and the like) respectively. Each of cam elements $E_1$, $E_2$, $E_3$, and $F_4$, has a respective cam element thickness T. In various embodiments, the cam elements $E_1$, $E_2$, $E_3$, and $E_4$, may be detachably affixed to the cam shaft 72. In an embodiment, as seen in FIGS. 12, 13, and 14, a plurality of retaining clamps 80 may be provided. In such an embodiment, pairs of retention grooves 82, are provided, spaced apart a distance G. And, pairs of retaining clamps 80 are provided. The pairs of retention grooves are spaced apart a distance G, which is approximately equal to said thickness T of cam elements $E_1$, $E_2$, $E_3$, $E_4$, (and the like). In an embodiment, one retaining clamp 80 in each pair of retaining clamps 80 is secured to the cam shaft 72 below a cam element $E_1$, $E_2$, $E_3$, $E_4$, (and the like), and one retaining clamp 80 in each pair of retaining clamps 80 is secured to the cam shaft 72 above a cam element $E_1$ $E_2$, $E_3$, $E_4$, (and the like). In this manner, each of the cam elements $E_1$, $F_2$, $E_3$, $F_4$, (and the like) is secured at a selected vertical location along the cam shaft 72.

In various embodiments, the cam elements $E_1$, $F_2$, $E_3$, $E_4$, (and the like) each has an inner sidewall 84. In various embodiments, the inner sidewall 84 may have a key structure 86 therein. The key structure 86 is sized and shaped for interlocking sliding engagement with the keyway slot 78 in cam shaft 72. Thus the key structure 86 and the keyway slot 78 cooperate to prevent the cam elements $E_1$, $E_2$, $E_3$, $F_4$, (and the like) from rotary movement. As further described elsewhere herein, each cam element $E_1$, $E_2$, $E_3$, $E_4$, (and the like) is sized and shaped to provide cam surfaces $S_1$, $S_2$, $S_3$, $S_4$, (and the like) which interact with corresponding cam followers $F_1$, $F_2$, $F_3$, $F_4$ (and the like) for movement of the respective cam followers by the associated cam elements, to correlate water delivery quantity through an associated sprinkler nozzle assembly $A_1$, $A_2$, $A_3$, $A_4$ (and the like) for watering a surface of a land parcel 24 having a selected size and shape.

The upper housing 30 is rotatably coupled to the sprinkler base 28. the upper housing 30 is driven by the output gear 66, which may be configured as a pinion gear, to drive an annular gear 67 inside the lower end of upper housing 30. The upper housing 30 is configured for receiving water W from the base 28. The upper housing 30 is provided with at least one sprinkler nozzle assembly A, which is secured to housing 30 and rotatable therewith. In most embodiments, a plurality of nozzle assemblies A will be provided, in groups of nozzle assemblies A, B, C, D, etc, wherein each group will have multiple nozzles therein. For example, a group A may have nozzles numbered from $A_1$ to $A_x$, with X being a positive integer. Likewise, a group B of nozzle assemblies may be provided in a group B numbered from $B_1$ to $B_x$, where X is a positive integer. In an embodiment, as noted in FIGS. 17 and 18, numbering of X in groups may be provided in even numbers only, or in odd numbers only, as similar number for cam elements may proceed sequentially, with both even and odd integers, as such cam elements may be configured to a single nozzle N on a side of the upper housing 30, or multiple nozzles N on the upper housing 30. At least one sprinkler nozzle assembly A is secured to and rotatable with the upper housing 30.

As seen in FIGS. 3, 4, and 5, in an embodiment, a sprinkler nozzle assembly A1, etc, may include a corresponding nozzle N1 and a spring loaded valve V, which includes a spring 90 which biases a cam follower $F_1$ (similar numbering and function in other sprinkler nozzle assemblies need not be repeated) in an open direction. The cam follower F1 includes, at its distal end 91, a valve surface 92 for regulating or stopping flow of water W therethrough, when valve surface 92 is seated against seat 94. More generally, the spring loaded valve $V_1$ and a cam follower $F_1$ are responsive to a cam surface $S_1$ to adjust the spring loaded valve $V_1$ between an open position wherein water passes therethrough, and a closed position wherein water flow is substantially prevented therethrough. A cam surface S1 may regulate flow between an open position, as illustrated in FIG. 5, and closed position as seen in FIG. 3, by placing the cam follower at an intermediate position as seen in FIG. 4.

Figure 17:
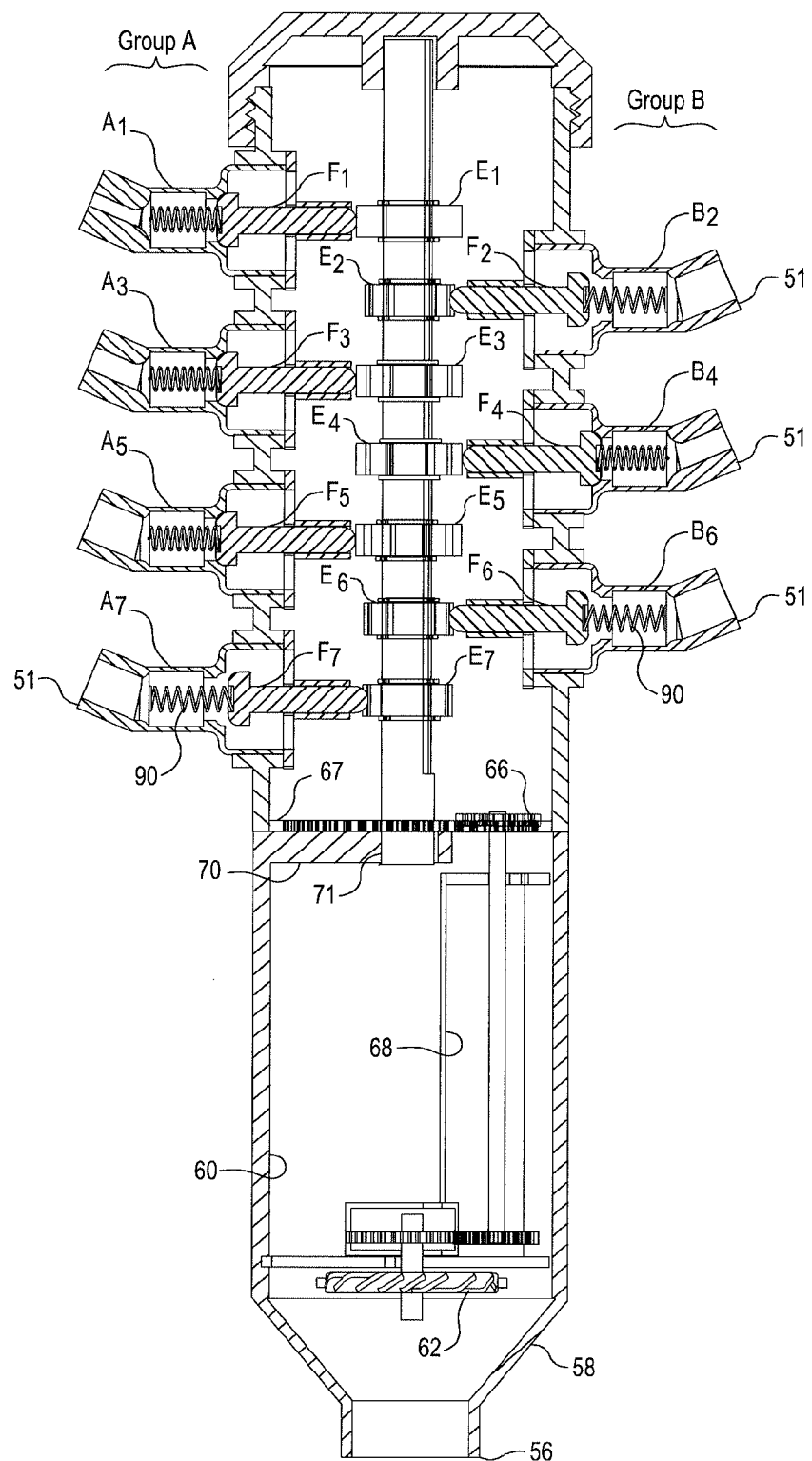
FIG. 17 provides a vertical cross-sectional view of yet another embodiment for a lawn sprinkler for watering an irregular shaped lawn area, showing a first group of nozzles on a first side and a second group of nozzles on a second side, with various nozzles in each group having various diameter outlets as suitable for projecting water different distances, and also showing a stationary lower housing, and a turbine driven upper housing on which the first group and second group of nozzles are mounted.

In various embodiments, the upper housing 30 may have at least a first side with a first group of nozzles N provided thereat, such as group A as noted in FIG. 1 or 17. And, in an embodiment, the upper housing may also have a second side with a second group of nozzles N thereon, such as group B as noted in FIGS. 17 and 18. Likewise, further groups such as a group C of nozzles N, or a group D of nozzles N, may be provided. More generally, the upper housing may have a plurality of sizes, such as X sides, wherein X is a positive integer, and wherein a group of sprinkler nozzle assemblies is provided on each of said X sides.

As seen by comparing FIG. 1 and FIG. 2, in a group of sprinkler nozzle assemblies, nozzles N are provided having a selected outlet diameter D. The selected outlet diameter D may vary amongst nozzles in any group of sprinkler nozzle assemblies A, B, etc., as dictated by water delivery requirements for the particular service to the land parcel 24. In an embodiment, such outlet diameters D may have diameters $D_1$, $D_2$, $D_3$, $D_4$ as shown in FIG. 2, wherein such diameters D are increasingly smaller at increasing mounting heights. Or, as shown in FIG. 1, diameters D may be configured to be increasingly smaller at decreasing mounting heights. When sprinkler nozzle assemblies are mounted in groups A, B, etc., such groups may be mounted in vertically aligned arrays, one above the other. More generally, nozzles N in each sprinkler nozzle assembly A may have nozzle diameters D selected to deliver water a selected range of radial distances R from the sprinkler 22, for watering a surface of a land parcel 24 having a selected size and shape. Yet more generally, the nozzles N in sprinkler 22 each have nozzle diameters D, which in cooperation with the groups of sprinkler nozzle assemblies A, B, C, etc. and with associated cam elements E, deliver a selected volume of water along a selected radial for a radial distance R from the sprinkler 22, for watering a surface of a land parcel 24 having a selected size and shape.

Lawn 24 may be irrigated using a lawn sprinkler 22 as described herein in order to water the irregularly shaped lawn while minimizing or substantially eliminating watering of areas beyond the perimeter 25 of the lawn 24. Further, in one embodiment, a relatively uniform volume of water per unit area (e.g., gallons per square foot of lawn 24 in a given period of time, or alternate measurement such as inches of rainfall equivalent over the irrigated area in a given period of time) may be provided to lawn 24, using sprinkler 22, or its pop-up type sprinkler equivalent, $22_P$.

It is to be appreciated that the various aspects, features, structures, and embodiments of a lawn sprinkler with flow regulator for substantially uniform delivery of water on a volume per square foot of lawn as described herein is a significant improvement in the state of the art. The lawn sprinkler design is simple, reliable, and easy to use. Although only a few exemplary aspects and embodiments have been described in detail, various details are sufficiently set forth in the drawing figures and in the specification provided herein to enable one of ordinary skill in the art to make and use the invention(s), which need not be further described by additional writing.

In the foregoing description, numerous details have been set forth in order to provide a thorough understanding of the disclosed exemplary embodiments for providing lawn sprinklers for watering irregularly shaped parcels. However, certain of the described details may not be required in order to provide useful embodiments, or to practice selected or other disclosed embodiments. Further, the description may include, for descriptive purposes, various relative terms such as surface, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various items in the apparatus and in the method(s) described herein may have been described as multiple discrete items, in turn, in a manner that is most helpful in understanding such aspects and details. However, the order of description should not be construed as to imply that such items or sequence of operations are necessarily order dependent, or that it is imperative to fully complete one step before starting another. For example, the choice of where and how to mount a set of nozzles, or selection of outlet diameters of such nozzles, may be determined by a particular parcel to be watered, and may be different as regards installation particulars amongst various situations, for example, depending on water pressure available, and the amount of water desired to be directed to the parcel. Further, certain details of installation may not need to be performed in the precise or exact order of presentation herein. And, in different embodiments, one or more items may be performed simultaneously, or eliminated in part or in whole while other items may be added. Also, the reader will note that the phrase "an embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by developments described herein, and may be embodied in other specific forms without departing from the spirit or essential characteristics thereof. Embodiments presented herein are to be considered in all respects as illustrative and not restrictive or limiting. This disclosure is intended to cover methods and apparatus described herein, and not only structural equivalents thereof, but also equivalent structures. Modifications and variations are possible in light of the above teachings. Therefore, the protection afforded to this invention should be limited only by the claims set forth herein, and the legal equivalents thereof.

The invention claimed is:

1. A sprinkler for watering a selected surface of a land parcel having a selected size and shape, said apparatus comprising:
a sprinkler base, said sprinkler base comprising a lower housing defined by a sprinkler base inner side wall, said sprinkler base comprising an inlet for receiving a pressurized water flow, an inlet turbine operably fixed in the base, a gear train having an output gear responsive to the inlet turbine, a mount supported by the base, a stationary cam shaft upwardly affixed from said mount, with at least one cam surface associated with the cam shaft, and
an upper housing, said upper housing rotatably coupled to said sprinkler base, said upper housing driven by said output gear, said upper housing configured for receiving water from said base, said upper housing further comprising at least one sprinkler nozzle assembly, said at least one sprinkler nozzle assembly secured to and rotatable with the upper housing, the sprinkler nozzle assembly comprising a nozzle, a spring loaded valve, and a cam follower responsive to said cam surface to adjust the spring loaded valve between an open position wherein water passes therethrough, and a closed position wherein water flow is substantially prevented therethrough.

2. The sprinkler as set forth in claim 1, wherein a plurality of cam surfaces are provided associated with said stationary cam shaft; and wherein a plurality of sprinkler nozzle assemblies are provided, each of said sprinkler nozzle assemblies comprising a nozzle, a spring loaded valve, and a cam follower responsive to one of said plurality of cam surfaces to adjust the spring loaded valve in the sprinkler nozzle assembly between an open position wherein water passes therethrough, and a closed position wherein water flow is substantially prevented therethrough.

3. The sprinkler as set forth in claim 2, wherein said upper housing comprises at least a first side, and wherein a first group of nozzles are provided on the first side.

4. The sprinkler as set forth in claim 3, wherein said upper housing further comprises a second side, and wherein second group of nozzles are provided on the second side.

5. The sprinkler as set forth in claim 2, wherein said upper housing comprises X sides, wherein X is a positive integer, and wherein a group of sprinkler nozzle assemblies is provided on each of said X sides.

6. The sprinkler as set forth in claim 5, wherein each nozzle in said group of sprinkler nozzle assemblies is provided having a selected outlet diameter D, and wherein said selected outlet diameter D varies amongst nozzles in said group of sprinkler nozzle assemblies.

7. The sprinkler as set forth in claim 6, wherein sprinkler nozzle assemblies in each group of sprinkler nozzle assemblies are mounted in a vertical array, one above another.

8. The sprinkler as set forth in claim 7, wherein the outlet diameter D of nozzles in each group of sprinkler nozzle assemblies varies between sprinkler nozzle assemblies in each vertical array.

9. The sprinkler as set forth in claim 8, wherein the outlet diameter D in each group of sprinkler nozzle assemblies varies vertically.

10. The sprinkler as set forth in claim 9, wherein the outlet diameter D in each group of sprinkler nozzle assemblies decreases vertically in an upward direction.

11. The sprinkler as set forth in claim 9, wherein the outlet diameter D in each group of sprinkler nozzle assemblies decreases vertically in a downward direction.

12. The sprinkler as set forth in claim 5, wherein said cam surfaces are each provided by a cam element having a thickness T, and wherein said cam element is detachably affixed to said cam shaft.

13. The sprinkler as set forth in claim 12, further comprising a plurality of retaining clamps, and wherein said cam shaft further comprises pairs of retention grooves, said pairs of retention grooves spaced apart a distance G, said distance G approximately equal to said thickness T, and wherein one retaining clamp in each pair of retaining clamps is secured to said cam shaft below a cam element, and wherein one retaining clamp in each pair of retaining clamps is secured to said cam shaft above a cam element, to thereby secure a cam element at a selected vertical location along said cam shaft.

14. The sprinkler as set forth in claim 13, wherein said cam shaft further comprises an inwardly extending keyway slot, said keyway slot defined by a vertically extending keyway wall.

15. The sprinkler as set forth in claim 13, wherein said cam element comprises an inner sidewall, said inner sidewall further comprising a key structure therein, said key structure sized and shaped for interlocking sliding engagement with said keyway slot in said cam, said key structure and said keyway slot cooperating to prevent said cam element from rotary movement.

16. The sprinkler as set forth in claim 15, wherein each cam element is sized and shaped to provide cam follower movement correlated to water delivery quantity through an associated sprinkler nozzle assembly, for watering a surface of a land parcel having a selected size and shape.

17. The sprinkler as set forth in claim 16, wherein said nozzles N in said sprinkler each have nozzle diameters D selected to deliver water a selected range of radial distances R from said sprinkler, for watering a surface of a land parcel having a selected size and shape.

18. The sprinkler as set forth in claim 17, wherein said nozzles N in said sprinkler each have nozzle diameters D, which in co-operation with said sprinkler nozzle assembly and with said cam element, deliver a selected volume of water along a selected radial for a radial distance R from said sprinkler, for watering a surface of a land parcel having a selected size and shape.

19. The sprinkler as set forth in claim 5, further comprising a generally cylindrical outer housing, said outer housing having an outer diameter OD approximately corresponding to the spacing between distal ends of nozzles in first and second groups of nozzles oriented at one hundred eighty degrees from each other.

20. The sprinkler as set forth in claim 1, wherein said upper housing further comprises an annular gear, and wherein said output gear drives said annular gear, rotating the upper housing rotates.

21. The sprinkler as set forth in claim 1 or in claim 19, further comprising a pressurizable receiver, said pressurizable receiver sized and shaped to receive at least said base therein, vertically house and slidingly cradle said base, wherein upon pressurization by water, said base rises vertically from said pressurizable receiver, to provide a pop-up sprinkler.

22. The sprinkler as set forth in claim 1 or in claim 2, wherein each one of said at least one sprinkler nozzle assembly comprises a cam follower responsive to said cam surface, upon rotation of said cam follower, to adjust the spring loaded valve to regulate the flow of water therethrough by increasing, or by decreasing, or by keeping constant the flow of water therethrough.

* * * * *